March 24, 1964

C. W. BONNER, JR., ETAL 3,126,014

TOBACCO THRESHING MACHINE

Filed Nov. 9, 1961

INVENTORS
Charles W. Bonner, Jr. &
Curtis T. Houck
BY
Mason, Fenwick & Lawrence
ATTORNEYS March 24, 1964  C. W. BONNER, JR., ETAL  3,126,014
TOBACCO THRESHING MACHINE
Filed Nov. 9, 1961  2 Sheets-Sheet 2

INVENTORS
Charles W. Bonner, Jr. &
Curtis T. Houck
BY Mason, Fenwick & Lawrence
ATTORNEYS United States Patent Office 3,126,014
Patented Mar. 24, 1964

3,126,014
TOBACCO THRESHING MACHINE
Charles W. Bonner, Jr., and Curtis T. Houck, both of Richmond, Va., assignors to The Cardwell Machine Company, Richmond, Va., a corporation of Virginia
Filed Nov. 9, 1961, Ser. No. 151,296
4 Claims. (Cl. 131—145)

The present invention relates to tobacco threshing machines for ripping and tearing leaf lamina from stems and large veins of tobacco leaves.

In the factory or commercial processing of tobacco as currently practiced, the tobacco leaf is broken up into lamina, stem and large vein components and the lamina components are separated from the others by passing the leaves through a series of threshing machines and pneumatic separators. Usually about four or more threshing stages, each involving a threshing machine, are employed, each followed by at least one pneumatic separator. The tobacco threshing machines currently in use have a rotary threshing element provided with radially extending teeth or knives coacting with stationary teeth and/or a perforated concave grid, cage or basket. The leaves dropped onto the rotor are driven by the rotor through the stationary teeth or are struck by the rotor teeth against the perforated edges of the concave grid or cage, causing the leaf to break up and the leaf components to fall through the cage perforations, whereupon they are delivered to the pneumatic separator for segregating the clean lamina components from the heavier stem and large vein parts. Such threshers generally produce a relatively small lamina product and leave substantial lamina adhering to the stem portions, so that the stem and adhering lamina portions must be subsequently processed through a plurality of successive threshing and separating stages to effect relatively complete removal of lamina from the stems. The use of a number of sets of such threshing machines and pneumatic separators is not only costly but consumes a considerable amount of valuable factory floor space.

An object of the present invention is the provision of a novel tobacco threshing machine for obtaining a more efficient removal of leaf lamina from stems and wherein a larger clean leaf lamina product is produced.

Another object of the present invention is the provision of a novel tobacco threshing machine having dual threshing stages which is comparable in size to conventional single stage threshing machines and which attains efficient removal of lamina from stems in one pass.

Another object of the present invention is the provision of a novel tobacco threshing machine of the type having a pair of rotary threshing elements coacting with each other and with concave cages of two different types to produce a larger clean lamina product and a mixed lamina and stem product that can be more easily separated.

Other objects, advantages and capabilities of the present invention will become apparent from the following detail description, taken in conjunction with the accompanying drawings illustrating a preferred embodiment of the invention.

Figure 1:
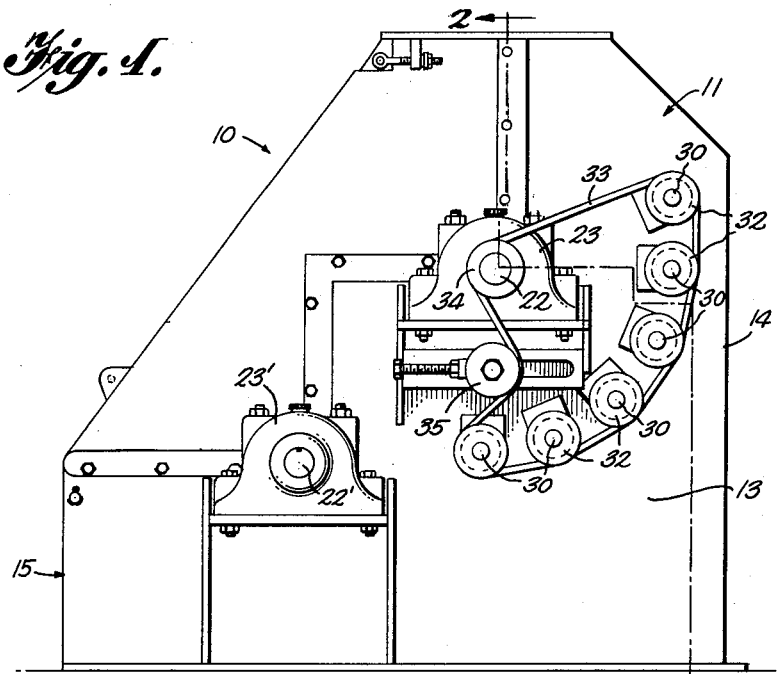
FIGURE 1 is a side elevation of a tobacco threshing machine embodying the present invention.
Figure 2:
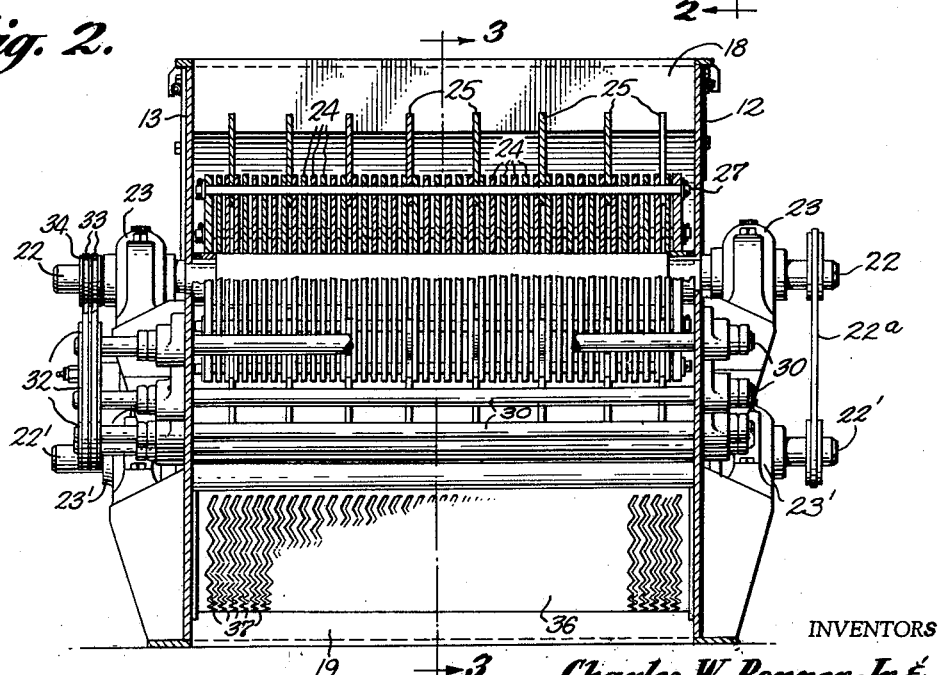
FIGURE 2 is a vertical transverse section view taken along the line 2—2 of FIGURE 1.

Referring to the drawings, wherein like reference characters designate corresponding parts throughout the several figures, the tobacco threshing machine of the present invention, indicated in general by the reference character 10, is of the dual rotor or dual stage type to rip large pieces of leaf lamina from the leaf in the first stage and discharge the same and pass the mixed pieces of lamina and stem to the second stage to reduce the amount of lamina attached to the stem. The tobacco threshing machine includes a housing or casing 11 having a pair of side walls 12, 13, an upstanding end wall 14 at one end thereof and an upstanding end wall 15 in the lower region of the opposite wall which, together with pivoted concave doors 16 and 17, complete the wall of the housing opposite the wall 14. A leaf charging or inlet opening 18 is formed at the upper end of the housing 11 and the lower end of the housing is open to provide a large discharge opening 19.

A first threshing rotor 20 is disposed within the housing 10 directly below the charging opening 18 and a second threshing rotor 21 is disposed below and to one side of the first rotor. The threshing rotors 20 and 21 are of similar construction and include, respectively, main shafts 22, 22' journaled in bearing brackets 23, 23' fixed to the side walls 12, 13. The main shafts 22, 22' carry a series of circular plates 24, 24', respectively, fixed to the shafts and spaced from each other for the reception therebetween of rotor teeth 25, 25'. The teeth 25, 25' are secured against rotation with respect to their associated plates 24, 24' by parallel flanges 26, 26' in which the sides of the teeth are snugly fitted. The teeth 25, 25' are further snugly locked in place by means of rods 27, 27' which extend parallel to the axes of the respective shafts 22, 22' and through selected ones of the holes 28, 28' in the circular plates 24, 24' and through corresponding holes in each tooth.

The knives 25 of the first stage rotor 20 work against a concave cage 29 formed of laterally spaced, transversely extending parallel grid rods 30 which are journaled for rotation about their axes in suitable openings or bearings provided in the side walls 12, 13 of the housing 11 and are spaced to define openings 31 therebetween to pass below the cage 29 and through the discharge opening 19 the large clean pieces of lamina which are threshed from the leaves by the knives 25 moving therethrough and the inter-action of the knives with the grid rods 30. The grid rods 30 forming the first stage cage 29 are driven in corresponding directions about their axes by means of pulleys 32 fixed to ends of the grid rods 30 projecting externally of the housing 11, about which are trained a belt 33 which also is trained about a pulley 34 fixed to an exterior end of the main shaft 22 and a conventional tension pulley 35. The main shaft 22 of the first stage rotor 20 is driven by any suitable motor or driving means (not shown) in a manner similar to conventional tobacco threshing machines.

A substantially semi-circular concave cage 36 forms a curved grid for the second stage rotor 21 and extends in substantially concentric relation below the rotor 21 so that the curvature of the cage 36 follows the axis of rotation of the second stage rotor knives 25'. The cage 36 may be formed of a concavely curved sheet metal plate which is provided with rows of zigzag shaped or other conventionally configurated slots or openings 37, the cage 36 being slightly spaced from the outer ends of the knives 25' to serve to retain the material which is being threshed in the effective working zone of the knives and prevent it from falling too quickly away from the working zone.

Figure 3:
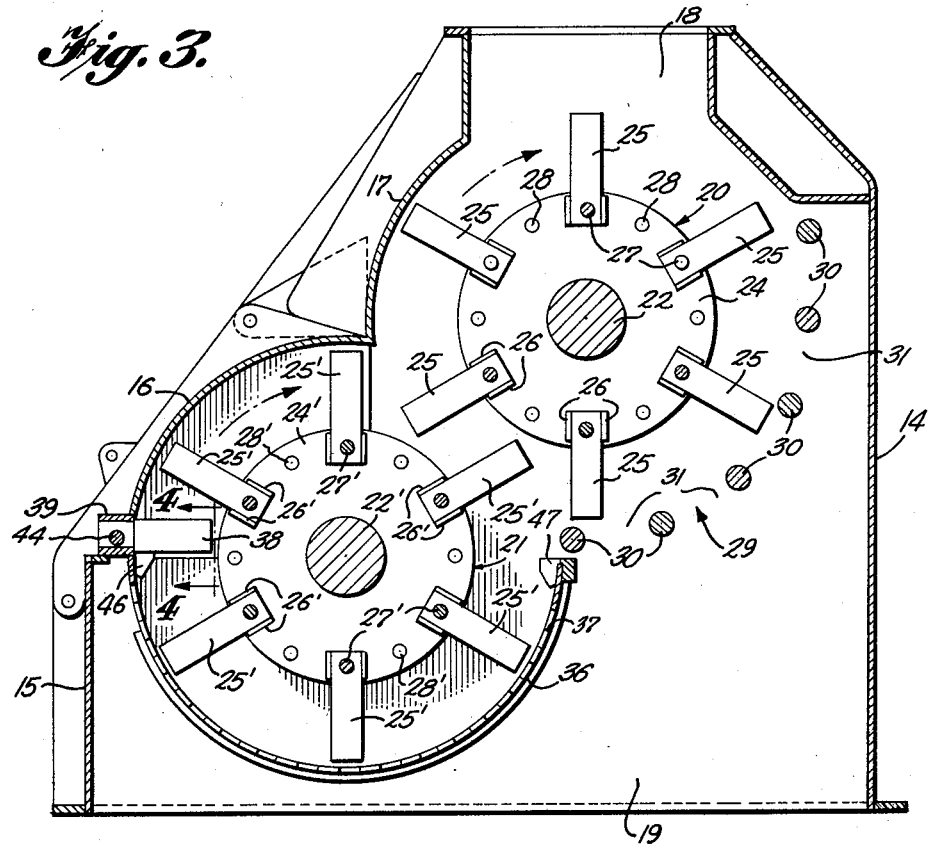
FIGURE 3 is a vertical section view taken along the line 3—3 of FIGURE 2.
Figure 4:
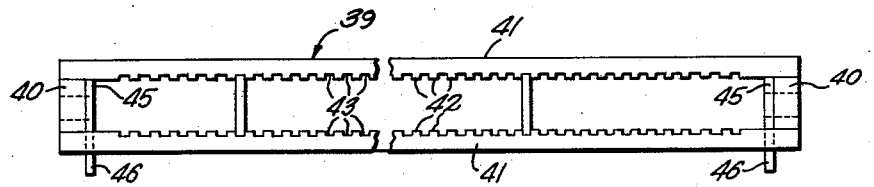
FIGURE 4 is a fragmentary section view taken along the line 4—4 of FIGURE 3.

To further produce effective removal of leaf lamina from stems and heavy veins in the second stage, a plurality of stationary knives 38 are located to the left of the rotor 21 slightly above the axis of the rotor, as viewed in FIGURE 3, the stationary knives 38 being disposed in side-by-side transverse alignment with their bases inserted in the slots of a multi-slotted knife bar 39 as illustrated in FIGURE 4, which may conveniently be carried by parts of the concave door 16. The slotted knife bar 39 may include two opposite end blocks 40 located at opposite ends of slotted walls 41 extending in parallel horizontal relation, the walls 41 being provided on their adjacent faces with alternate ridges and grooves 42 and 43 providing slots into which the knives 38 may be inserted. The bases of the knives 38 and the end blocks 40 are apertured to receive therethrough locking rods 44 similar in construction and operation to the locking rods 27, 27' of the rotors 20, 21. Additional end plate members 45 are provided at the opposite ends of the slotted knife bar 39 and include a depending tab or tail 46 shaped to prevent the curved cage or grid member 36 from becoming loose and shifting out of its normal position into obstructing relation to the rotor teeth 25'. Similar retaining elements 47 are provided on the side walls 12, 13 of the casing for the opposite end of the cage or grid member 36.

The second stage rotor 21 is driven in a corresponding direction to the first stage rotor 20 by any suitable means, such as a belt connection 22a between the main shafts 22' and 22. It will be noted that the space between the main shafts 22 and 22' of the rotors 20 and 21 is such that the knives 25' of the second stage rotor 21 lap in inter-leafing relation the knives 25 of the first stage rotor 20 providing a counterrotational zone whereby the knives 25' positively take away from the knives 25 the mixed pieces of lamina and stem transported by the knives 25 to the counterrotational zone permitting a faster processing of the material by reducing the carry-over or recirculation of the tobacco within the first stage.

In the operation of the invention, the tobacco leaves introduced through the charging opening 18 are picked up by the knives 25 of the first stage rotor 20 and advanced in a clockwise direction, as viewed in FIGURE 3, along an arcuate path adjacent the rotating grid rods 30 forming the concave cage 29. The knives 25 advancing through the mass of tobacco leaves rips clean pieces of leaf lamina from the tobacco leaves, which are found to be of somewhat larger size than that encountered in conventional tobacco threshing machines, the large pieces of clean lamina being readily passed through the openings 31 between the rotating grid rods 30 by reason of the spacing between the rods and the driving of the rods about their axes. Substantially all of the pieces of mixed lamina and stem are carried thence into the counterrotational zone where they are stripped from the knives 25 by the knives 25' of the second stage rotor 21 and advanced downwardly in an arcuate path along the surface of the concave grid member or cage 36. The action of the knives 25' on the mixed lamina and stem pieces and the co-action of the edges of the openings 37 on the grid member 36 effects further removal of the clean lamina pieces from the stem, the stationary knives 38 also serving to accomplish the desired threshing of the leaves into lamina and stem pieces at this second stage. When the tobacco is ripped to an appropriate small size, it then passes through the openings 37 in the grid member 36 and is discharged through the opening 19.

It has been discovered that by the use of this apparatus, a substantial upgrading in the threshing product is achieved, in that larger clean lamina product is produced and the mixed lamina and stem product which is discharged through the grid member 36 can be more readily separated by pneumatic separators for removal of the clean lamina pieces from the mixed product. A greater volume of material can be processed per unit time by this device, and by providing for plural zone threshing in one machine, there is reduced opportunity for moisture release from the tobacco product, such as may occur where intervening air separators are provided between several successive threshing machine stations, so that the tobacco is being processed when it is in the best condition, moisturewise, for effective threshing.

While but one preferred example of the present invention has been particularly shown and described, it is apparent that various modifications may be made therein within the spirit and scope of the invention, and it is desired, therefore, that only such limitations be placed on the invention as are set forth in the appended claims.

What is claimed is:

1. A tobacco threshing machine comprising a casing having a charging opening and a discharge opening, a pair of spaced parallel transverse shafts journaled in said casing, first and second serially arranged threshing rotors mounted on said shafts, said second rotor being located below and to one side of said first rotor, each of said threshing rotors having radially projecting leaf cutting knives axially and circumferentially disposed thereon, said first rotor being arranged to receive tobacco leaves from said charging opening and convey the leaves toward said second rotor, drive means rotating said rotors in the same direction, a plurality of circumferentially spaced rotatable grid rods extending transversely in the casing along a concave path substantially concentric with the first rotor shaft adjacent the periphery of said first rotor to provide a grid formation between said first rotor and the discharge opening, the knives of said first rotor and said grid rods being spaced to act on the tobacco leaves to rip clean the leaf lamina therefrom and pass the same through said grid formation to said discharge opening, and a concave grid disposed in said casing substantially concentric with the second rotor shaft adjacent the periphery of said second rotor between said second rotor and said discharge opening and having a plurality of openings for passing pieces of lamina and pieces of stems to said discharge opening, said knives of said second rotor and said concave grid acting to further rip leaf lamina from pieces of mixed lamina and stem conveyed thereto from said first rotor, the knives of said second rotor being spaced relative to the knives of said first rotor to intermesh and form a counterrotational zone for transfer of tobacco from said first rotor to said second rotor.

2. A tobacco threshing machine comprising a casing having a charging opening and a discharge opening, a pair of spaced parallel transverse shafts journaled in said casing, first and second serially arranged threshing rotors mounted on said shafts, said second rotor being located below and to one side of said first rotor, each of said threshing rotors having radially projecting leaf cutting knives axially and circumferentially disposed thereon, said first rotor being arranged to receive tobacco leaves from said charging opening and convey the leaves toward said second rotor, a plurality of circumferentially spaced rotatable grid rods extending transversely in the casing along a concave path about the periphery of said first rotor to provide a grid formation between said first rotor and the discharge opening, said concave path extending substantially concentric with the first rotor shaft through a substantially quadrantal arc terminating adjacent the vertical plane including said shaft, drive means rotating said rotors and grid rods in the same direction, the knives of said first rotor and said grid rods being spaced to act on the tobacco leaves to rip clean leaf lamina therefrom and pass the same through said grid formation to said discharge opening, the shaft of said second rotor being rotated in substantially horizontal alignment with the lower terminus of said concave path, and a concave grid concentric with the second rotor shaft disposed in said casing about the periphery of said second rotor between said second rotor and said discharge opening and extending over substantially a semicircular arc from the terminus of said concave path, said concave grid having a plurality of openings for passing pieces of lamina and pieces of stems to said discharge opening, said knives of said second rotor and said concave grid acting to further rip leaf lamina from pieces of mixed lamina and stem conveyed thereto from said first rotor, the knives of said second rotor being spaced relative to the knives of said first rotor to intermesh and form a counterrotational zone for transfer of tobacco from said first rotor to said second rotor.

3. In a tobacco threshing machine, the combination defined in claim 2, wherein said second concave grid comprises a concave plate of sheet material having a plurality of axially spaced circumferentially extending zig-zag slots bounded by leaf cutting edges extending over the area thereof sized to pass pieces of clean lamina and stems of smaller size than that passed between said grid rods.

4. In a tobacco threshing machine, the combination defined in claim 2, wherein said second concave grid comprises a concave plate of sheet material having a plurality of axially spaced circumferentially extending zig-zag slots bounded by leaf cutting edges extending over the area thereof sized to pass pieces of clean lamina and stems of smaller size than that passed between said grid rods, and stationary leaf cutting knives supported in said casing projecting inwardly from said casing in the path of rotation of the knives of said second rotor positioned to intermesh therewith and lying in a substantially horizontal common plane located adjacent an end of said concave grid remote from the terminus of said concave path.

References Cited in the file of this patent

UNITED STATES PATENTS

| | | |
|---|---|---|
| 88,092 | Stacy | Mar. 23, 1869 |
| 209,801 | Du Brul | Nov. 12, 1878 |
| 897,030 | Stephenson | Aug. 25, 1908 |
| 1,342,806 | Gross | June 8, 1920 |
| 2,150,493 | Dahlstrom et al. | Mar. 14, 1939 |
| 2,701,570 | Eissmann | Feb. 8, 1955 |
| 2,760,492 | Allen | Aug. 28, 1956 |
| 2,789,564 | Hunter | Apr. 23, 1957 |

FOREIGN PATENTS

| | | |
|---|---|---|
| 1,238,099 | France | June 27, 1960 |
| 364,305 | Great Britain | Jan. 7, 1932 |